US 11,867,982 B2

(12) United States Patent
Donoli et al.

(10) Patent No.: US 11,867,982 B2
(45) Date of Patent: Jan. 9, 2024

(54) NOSE PAD FOR THE NOSEPIECE OF A PAIR OF EYEGLASSES

(71) Applicant: LUXOTTICA S.R.L., Agordo (IT)

(72) Inventors: Alessandro Donoli, Padua (IT); Fabio Borsoi, Vittorio Veneto (IT)

(73) Assignee: LUXOTTICA S.R.L., Agordo (IT)

(*) Notice: Subject to any disclaimer, the term of this patent is extended or adjusted under 35 U.S.C. 154(b) by 217 days.

(21) Appl. No.: 17/291,756

(22) PCT Filed: Oct. 22, 2019

(86) PCT No.: PCT/EP2019/078685
§ 371 (c)(1),
(2) Date: May 6, 2021

(87) PCT Pub. No.: WO2020/094384
PCT Pub. Date: May 14, 2020

(65) Prior Publication Data
US 2021/0389604 A1 Dec. 16, 2021

(30) Foreign Application Priority Data
Nov. 9, 2018 (IT) .......................... 102018000010186

(51) Int. Cl.
G02C 5/12 (2006.01)
G02C 11/00 (2006.01)

(52) U.S. Cl.
CPC ................ G02C 5/12 (2013.01); G02C 11/10 (2013.01)

(58) Field of Classification Search
None
See application file for complete search history.

(56) References Cited

U.S. PATENT DOCUMENTS

2008/0218684 A1 9/2008 Howell et al.
2010/0225879 A1* 9/2010 Pulito ................ A61F 9/026
351/137
(Continued)

FOREIGN PATENT DOCUMENTS

CN 104508539 A 4/2015
CN 105929564 A 9/2016
(Continued)

OTHER PUBLICATIONS

International Search Report dated Dec. 2, 2019 re: Application No. PCT/EP2019/078685, pp. 1-3, citing: WO 2013/186731 A1, CN 105 929 564 A, US 2008/00218684 A1 and WO 2017/108981 A1.
(Continued)

Primary Examiner — Darryl J Collins
(74) Attorney, Agent, or Firm — CANTOR COLBURN LLP

(57) ABSTRACT

A nose pad for the nosepiece of a pair of eyeglasses, which is made of material that is at least partially transparent and defines a resting surface which can be rested directly on the nose of a user includes
a connecting portion, which is fixed to the nose pad and is provided with a through hole for connection to a supporting pin which is integral with the frame of the pair of eyeglasses. The nose pad also includes
an insert, which is at least partially embedded within the nose pad and is visible from the outside through a transparent portion of the resting surface of the nose pad.

12 Claims, 4 Drawing Sheets

(56) References Cited

U.S. PATENT DOCUMENTS

| | | | | |
|---|---|---|---|---|
| 2015/0160472 A1* | 6/2015 | Buffa | ................ | G02C 5/12 351/178 |
| 2021/0232816 A1* | 7/2021 | Chen | ................ | G06Q 30/0185 |

FOREIGN PATENT DOCUMENTS

| | | |
|---|---|---|
| CN | 107340609 A | 11/2017 |
| CN | 206920747 U | 1/2018 |
| CN | 207457629 U | 6/2018 |
| CN | 108431680 A | 8/2018 |
| IT | PD2003A000078 | 10/2004 |
| JP | 10253929 A | 9/1998 |
| JP | 2005149079 A | 6/2005 |
| JP | 2006040109 A | 2/2006 |
| JP | 2016011970 A | 1/2016 |
| JP | 2019506018 A | 2/2019 |
| JP | 2019533177 A | 11/2019 |
| KR | 20090010616 A | 1/2009 |
| WO | 2013186731 A1 | 12/2013 |
| WO | 2017108981 A1 | 6/2017 |
| WO | 2018147124 A1 | 8/2018 |

OTHER PUBLICATIONS

IT Search Report dated Jul. 3, 2019 re: Application No. IT 2018000010186, pp. 1-7, citing: WO 2013/186731 A1, CN 105 929 564 A, US 2008/00218684 A1 and WO 2017/108981 A1.
Written Opinion dated Dec. 2, 2019 re: Application No. PCT/EP2019/078685, pp. 1-7, citing: WO 2013/186731 A1, CN 105 929 564 A, US 2008/00218684 A1 and WO 2017/108981 A1.
Japanese Office Action for Japanese Application No. 2021-525152, dated Apr. 11, 2023, 28 pages with translation.
Chinese Office Action for Chinese Application No. 201980073857.7, dated Mar. 18, 2023, 13 pages with translation.
Chinese Office Action for Chinese Application No. 2019800738577, dated Aug. 2, 2023, 11 pages with translation.
Japanese Office Action for Japanese Application No. 2021-525152, dated Oct. 3, 2023, 12 pages with translation.

* cited by examiner

NOSE PAD FOR THE NOSEPIECE OF A PAIR OF EYEGLASSES

TECHNICAL FIELD

The present disclosure relates to a nose pad for the nosepiece of a pair of eyeglasses.

BACKGROUND

In the eyeglasses sector, the nosepiece is the structure forming part of the frame that enables the frame to be placed on the nose of the user.

The nosepiece generally comprises a pair of pins which extend away from the bridge and which support, at their lower ends, respective nose pads which are adapted to come into direct contact with the nose of the user. In particular, the nose pads have a rear connecting portion which is provided with a through hole which is designed to accommodate the end part of the respective pin.

It is known that one of the principal requirements for transmitting a desired level of comfort for the user is that the nose pads offer a certain mobility which is such as to adapt to the shape structure of the nose.

Solutions are therefore known, which generally comprise rigid nose pads, which are adapted to allow a certain mobility of the nose pad, for example solutions of the type described in Italian patent application no. PD2003A000078, in which the coupling between the nose pad and the pin is obtained by way of tapering of the through hole into which the pin is inserted, in particular from the ends of the hole toward the inside. Such connection system between the nose pad and the pin is further implemented so as to limit the angular excursion of the nose pad with respect to the pin.

In the above mentioned solutions, furthermore, the use is known of an insert embedded within the nose pad and bearing a logo of the maker or a wording, which is visible from outside by making the nose pad from a transparent rigid material.

It is furthermore known that an additional requirement necessary to allow an adequate ease of substitution is that the nose pads can be easily mounted on (and removed from) the respective arm.

In such context, solutions are known that use a deformable material for providing the connecting portion that contains the hole for connection to the pin.

In this manner, the mobility of the nose pad is assured by the deformability of the material from which the connecting portion is made. Disadvantageously, in the solutions with a rigid nose pad the removal of the nose pad from the pin (as well as its mounting on the pin) has been found to be difficult, mainly owing to the high rigidity of the material that constitutes the nose pad.

Furthermore, in this type of solution it is difficult to give the nose pad the required mobility, it being necessary to design an adequate geometry of the parts that constitute the joint between the nose pad and the pin, with particular reference to the reliability of such mobility over time.

In the solutions that use a deformable material for the connecting portion, on the other hand, a specific difficulty has been noted in associating an insert inside the nose pad, therefore such solutions do not allow the possibility of inserting inserts bearing logos or wordings into the nose pad.

Furthermore, one of the major problems in today's world is the counterfeiting of products and the gray market. Eyeglasses are no exception to the problem of counterfeiting and the gray market, and therefore the need is felt to provide eyeglasses provided with identification devices that enable traceability and make it possible to distinguish authentic products from counterfeit products.

The identification devices are usually constituted by RFID tags, NFC tags, or generically by chips.

The chip must be read by an external device so that the authenticity of the pair of eyeglasses can be verified and so that the traceability data can be associated, precisely by virtue of reading the identification data contained in the memory of the chip.

Eyeglasses are currently known which are provided with identification chips located inside the frame itself in various positions, such as for example the temples, proximate to the hinges, and the like. All such solutions, however, have a major impact on the production of the frame of the pair of eyeglasses and therefore they are not economically attractive, as well as the fact that the appearance of the eyeglasses is often compromised by the presence of the chip.

SUMMARY

The aim of the present disclosure is to provide a nose pad for the nosepiece of a pair of eyeglasses which enables the adoption, in the nose pad, of an insert bearing a logo or a wording that is visible from outside and which ensures, at the same time, an adequate ease in the removal and in the mounting of the nose pad from/on the respective pin.

Within this aim, the present disclosure provides a nose pad for a nosepiece as above, which makes it possible to solve the problem of identifying the pair of eyeglasses and so that the manufacturing of the eyeglasses does not have a negative economic impact, and so that the appearance of the eyeglasses is not impaired.

The present disclosure also provides a pair of eyeglasses with the nose pad as above, in which the identification of the pair of eyeglasses occurs with an identification device that can be hidden from sight once fitted.

The present disclosure further provides a nose pad for a pair of eyeglasses in which the identification can occur by way of reading using an external reading device.

The present disclosure also provides a nose pad for a pair of eyeglasses which is highly reliable, easily and practically implemented and of low cost.

This aim and these and other advantages which will become better apparent hereinafter are achieved by providing a nose pad for the nosepiece of a pair of eyeglasses, which is made of material that is at least partially transparent and defines a resting surface which can be rested directly on the nose of a user;

a connecting portion, which is affixed to the nose pad and is provided with a through hole for connection to a supporting pin which is integral with the frame of the pair of eyeglasses;

an insert, which is at least partially embedded within the nose pad and is visible from the outside through a transparent portion of said resting surface of the nose pad;

said connecting portion of the nose pad being made of a material that is deformable at least elastically, said insert being provided with an identification device that is adapted to be read by an external reading device.

In particular, the nose pad according to the disclosure is at least partially transparent and defines a resting surface that can be rested directly on the nose of a user, a connecting portion which is affixed to the nose pad and has a through hole for connection to a supporting pin of a frame, and an insert which is at least partially embedded within the nose pad and is visible from outside through a transparent portion of the resting surface of the nose pad.

The nose pad according to the disclosure is characterized in that at least the connecting portion is made of a deformable material.

In particular, such material (from which the connecting portion is made) is deformable at least elastically; such elastic deformability confers softness on the material and permits an insertion and withdrawal of the nose pad with respect to the pin, where the pin has an enlarged free end in order to prevent an accidental extraction of the nose pad.

It should be noted that it is also envisaged that the material that constitutes the connecting portion is deformable, at least partially, plastically (i.e., the deformability is partially elastic and partially plastic). Furthermore, the deformable material is transparent.

Preferably, the material (i.e. the material that constitutes the connecting portion) is a flexible polymeric material.

In particular, such material preferably is selected from the group that comprises rubber, silicone, plasticized PVC (i.e. PVC with additives added that are adapted to confer deformability on the PVC), or polymeric mixtures (blends).

Preferably, the nose pad and the connecting portion are provided in a single piece and therefore can be made of the same material (i.e. the deformable material).

The insert has a surface that can carry a graphic motif and/or an inscription and/or an advertising logo, and can be visible from outside is through the resting surface of the nose pad, which is transparent.

The insert comprises a plate, which bears the graphic motif and/or inscription and/or advertising logo, which on the side opposite to the aforesaid graphic motif and/or inscription and/or advertising logo has a pair of protrusions which are at least partially not covered by the deformable material.

Preferably, the protrusions are provided in a single piece with the plate.

Preferably, the insert is made of rigid galvanized material. This enables excellent compliance with the coupling tolerances between the insert and the mold for making the nose pad.

BRIEF DESCRIPTION OF THE DRAWINGS

Further characteristics and advantages of the disclosure will become better apparent from the detailed description of a preferred, but not exclusive, embodiment of the nose pad for a pair of eyeglasses according to the present disclosure, illustrated by way of non-limiting example in the accompanying drawings wherein.

DETAILED DESCRIPTION OF THE DRAWINGS

Figure 1:
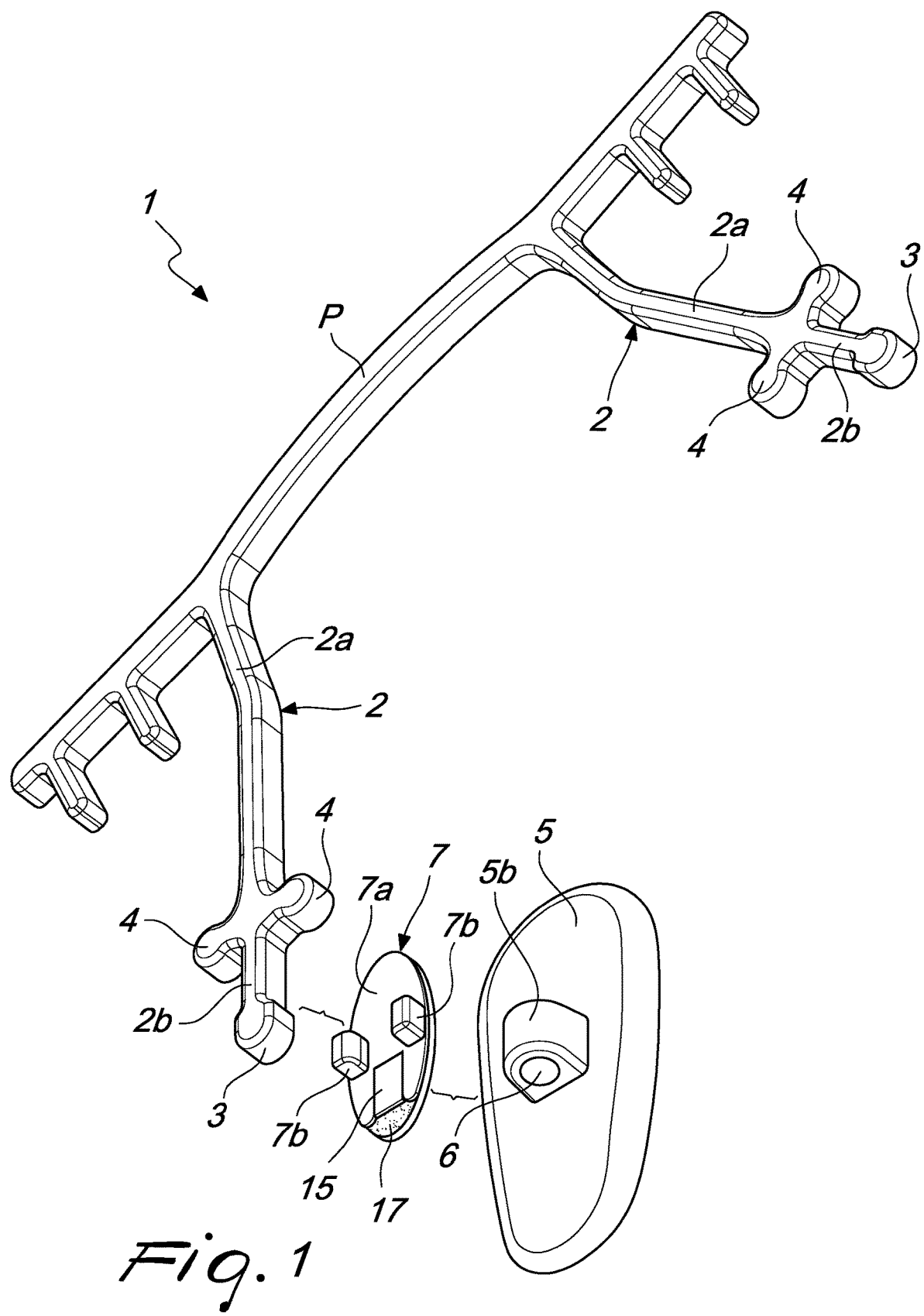
FIG. 1 is an exploded perspective view of a nosepiece of a pair of eyeglasses with a nose pad according to the disclosure.
Figure 2:
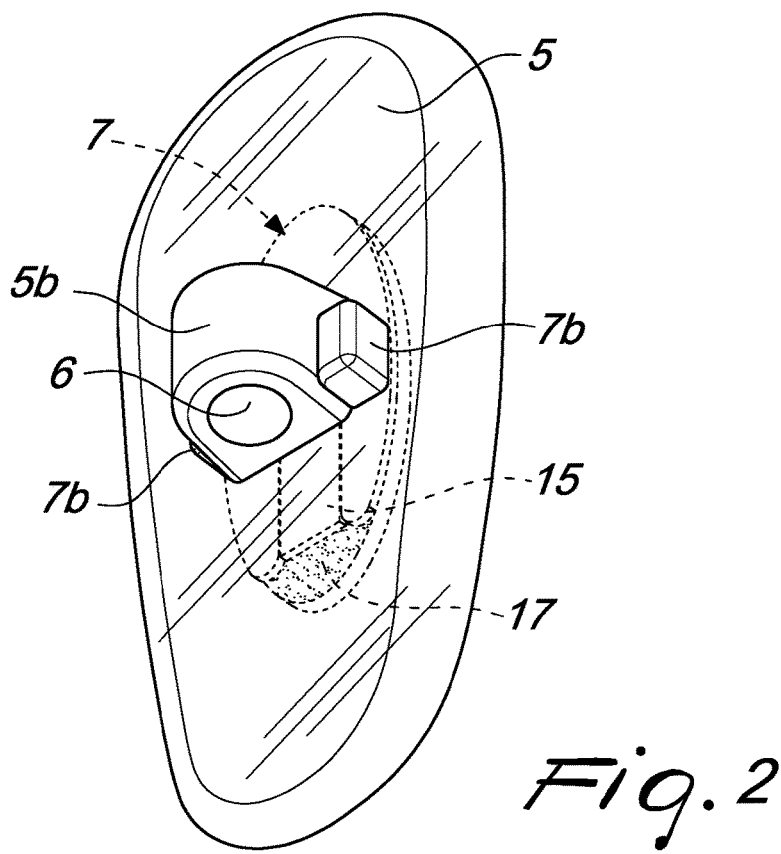
FIG. 2 is a perspective view of the nose pad according to the present disclosure.
Figure 3:
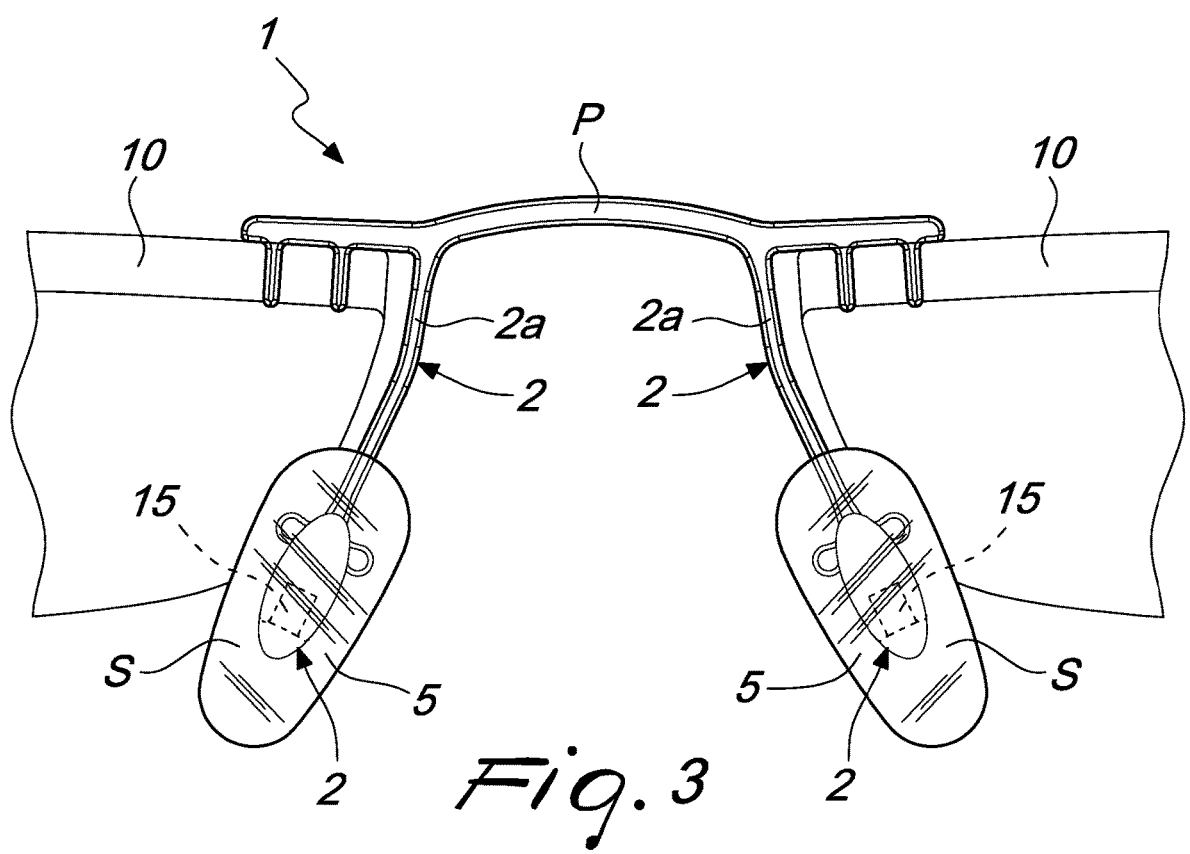
FIG. 3 is a front elevation view of the nosepiece with nose pad of FIG. 1 which is installed on a frame of a pair of eyeglasses.
Figure 4:
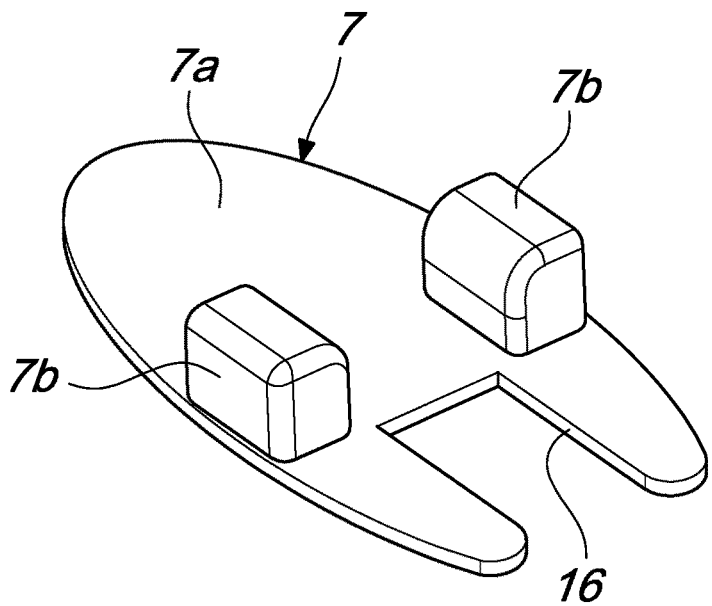
FIG. 4 shows a first step of providing the nose pad for the pair of eyeglasses according to the disclosure.
Figure 5:
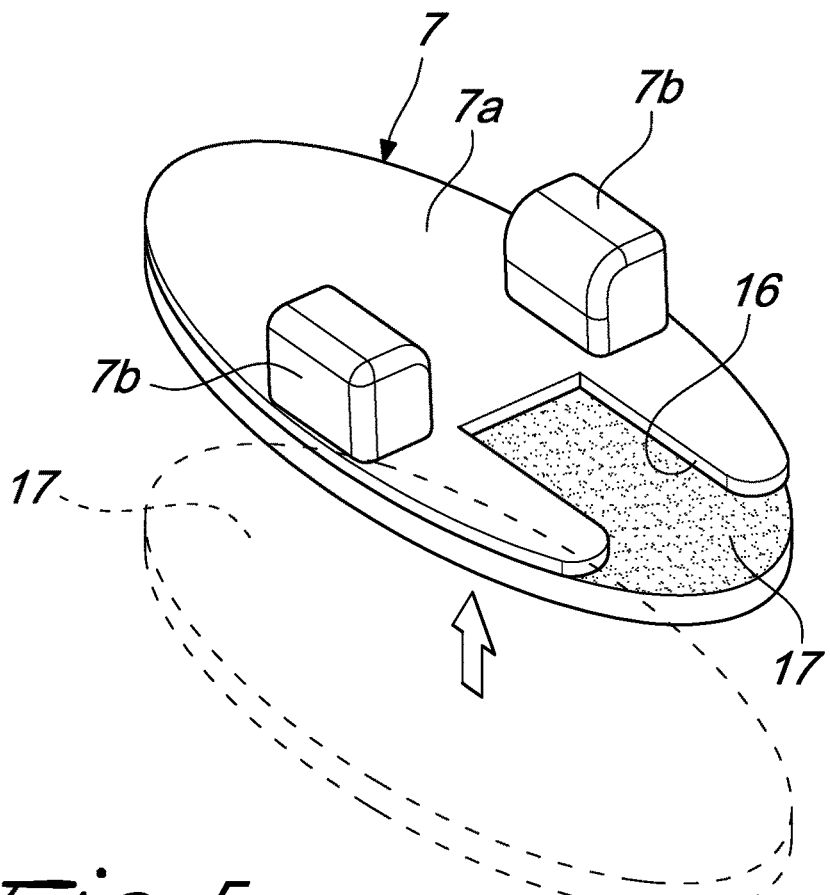
FIG. 5 shows a second step of providing the nose pad for the pair of eyeglasses according to the disclosure.
Figure 6:
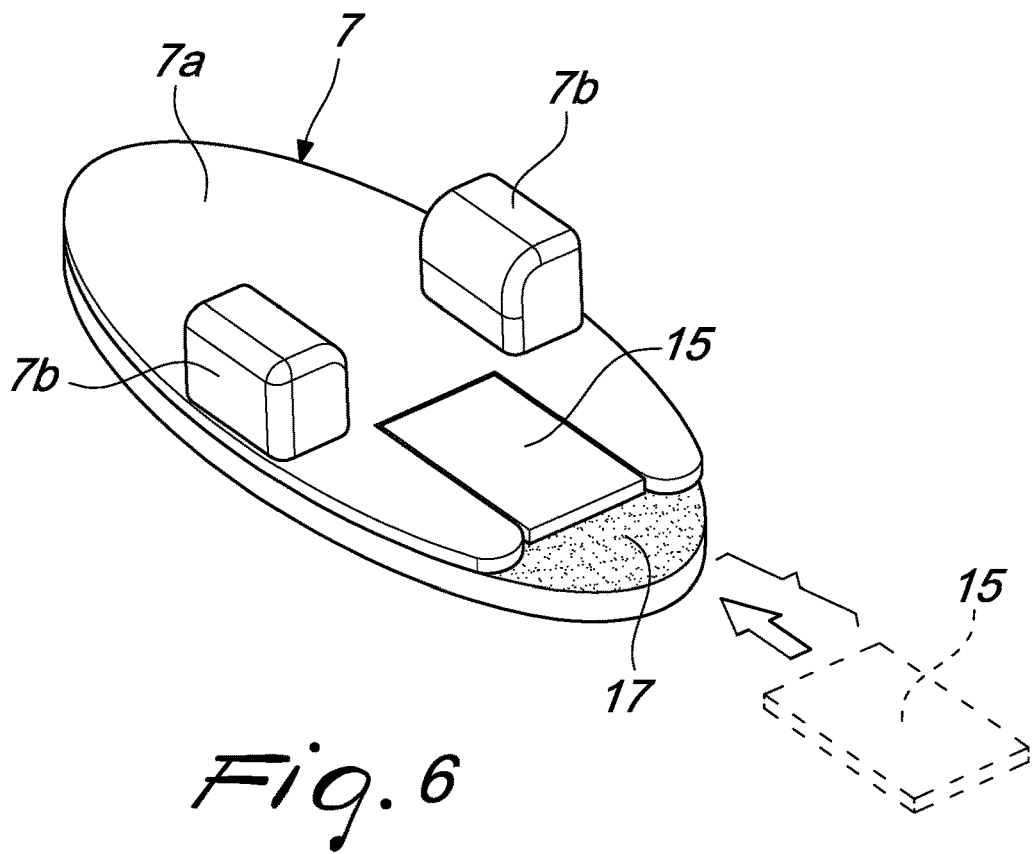
FIG. 6 shows a third step of providing the nose pad for the pair of eyeglasses according to the disclosure.
Figure 7:
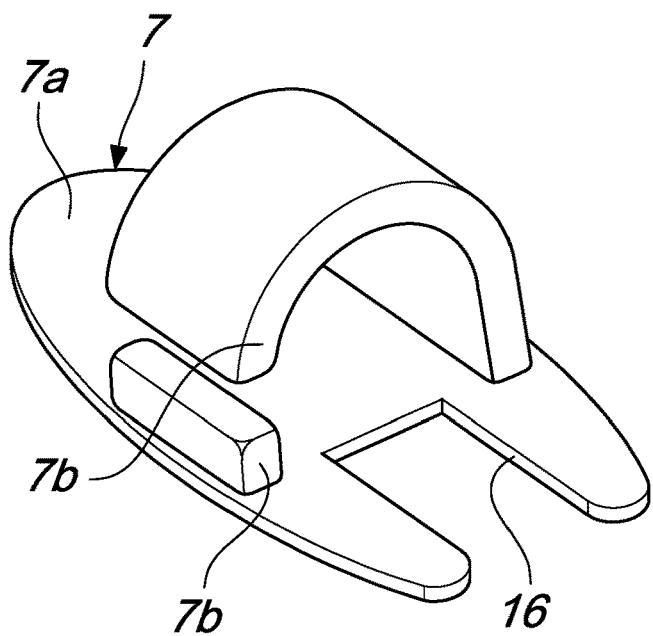
FIG. 7 shows a second embodiment of the nose pad according to the disclosure.

With reference to the figures, the reference numeral 1 generally designate a nosepiece for eyeglasses, which is associated with a part of the frame (in particular with the bridge "P" of a frame).

The nosepiece 1 (with the bridge "P") can be directly coupled to lenses 10.

As can be seen in FIG. 1, the nosepiece comprises a pair of arms 2 which extend away from the bridge "P" in a direction substantially perpendicular to the latter.

Each arm 2 has, at its free end opposite to the bridge "P", a cross-section widening 3.

Preferably, each arm 2 further has a pair of side protrusions 4 which diverge in mutually opposite directions and which divide the arm 2 into an upper, supporting portion 2a and a lower, anchoring portion 2b.

The side protrusions 4 and the lower portion 2b of the arm are oriented so as to define, in mutual cooperation, three mutually coplanar expansions the function of which will be explained below.

In the embodiment shown, the arms 2 have a quadrangular transverse cross-section, in particular rectangular or square. However, they can also have transverse cross-sections of different shape, for example circular.

As can be seen in FIG. 1, each arm 2 is associated with a nose pad 5 which is arranged at a lower end of the arm, and in particular at the lower, anchoring portion 2b, which therefore defines a supporting pin of the nose pad 5.

In more detail, the nose pad 5 is at least partially transparent and defines a resting surface "S" that can be rested directly on the nose of a user, is and a connecting portion 5b, which is fixed to the nose pad 5 and has a through hole 6 for connection to the previously mentioned supporting pin 2b (which is defined by the lower, anchoring portion 2b of the arm 2).

The through hole 6, in the embodiment shown, has a circular transverse cross-section, however it could have a transverse cross-section of different shape, for example rectangular or square.

The transverse cross-section of the through hole 6 is in any case preferably constant along the entire length of the hole 6.

Preferably, the resting surface "S", which can be flat or slightly convex, has a substantially elliptical development with a predominant direction of extension along the axis of the aforementioned through hole 6.

In particular, the connecting portion 5b is arranged on the other side with respect to the resting surface "S".

An insert 7 is at least partially embedded inside the nose pad 5, and is visible from the outside through a transparent portion of the resting surface "S" of the nose pad 5.

The insert 7 is entirely embedded in the material that constitutes the nose pad 5.

The insert 7 comprises a plate 7a which has, on the opposite side with respect to the resting surface S of the nose pad 5, i.e. on one of its faces, which is adapted to be directed toward the inside of the pair of eyeglasses, a pair of protrusions 7b which are at least partially not embedded in the nose pad 5.

In other words, at least an end part of the protrusions 7b protrudes from the external volume of the nose pad 5.

The two protrusions 7b have mutually parallel bases and are spaced apart so that the connecting portion 5b is comprised between the two protrusions 7b of the insert 7.

The two protrusions 7b can have symmetrical, mirror-symmetrical or asymmetrical shapes, all while retaining the parallelism of the bases from which they protrude.

In a preferential form one of the two protrusions 7b has the shape of a barb and the other protrusion has the shape of a cylinder.

Advantageously, at least the connecting portion 5b is made from a material that is deformable at least elastically.

Preferably, the nose pad 5 and the connecting portion 5b are provided in a single piece with the aforementioned deformable (at least elastically) material.

Advantageously, the aforesaid at least elastically deformable material is transparent and is preferably an elastically flexible polymeric material.

For example, such material is a material selected from the group that comprises rubber, silicone, plasticized PVC (i.e. PVC with additives added that are adapted to confer deformability on the PVC), or polymeric mixtures.

The insert 7 on the other hand is made of rigid material, preferably a galvanized plastic material. This makes it possible to correctly comply with the tolerances of the mold, something that is very difficult with inserts made of metal.

The protrusions 7b can be at least partially not covered by the elastically deformable material, or the inner surfaces which protrude toward the plate 7a can be at least partially covered by the elastically deformable material.

Preferably the insert 7, which is made in a single piece with the protrusions 7b, is made of ABS or PVC, in particular galvanized ABS or galvanized PVC.

In a connection system (joint) between the pin 2b and the nose pad 5 in a nosepiece of a pair of eyeglasses, the nose pad 5 is connected to the supporting pin 2b by inserting the supporting pin 2b into the through hole 6 of the connecting portion 5b.

The coupling between the pin 2b and the hole 6 can be by interference (preferred solution), in which case the mobility of the nose pad 5 is given by the deformability of the material that constitutes the connecting portion 5b, or with play, in which case the mobility of the nose pad 5 is given by the play between the pin 2b and the hole 6. The cross-section widening 3 of the end of the arm 2 therefore implements the retaining of the connecting portion 5b on the arm 2 in that the connecting portion 5b remains confined between the above mentioned cross-section widening and the two side protrusions 4 of the arm 2.

Furthermore, the nose pad 5 remains settled with its rear surface against the two side protrusions 4 which therefore limit the angular excursion of the nose pad 5 in rotation about the axis of the hole 6.

Conveniently, the nose pad 5 is provided with an identification device 15.

In particular, the insert 7 is provided with a through seat 16 which is defined as an interruption of the external profile of the insert 7. The size of the seat 16 is comparable with the size of the identification device (chip) 15 which is to be accommodated inside that seat.

The insert 7 with the seat 16 thus provided enables the accommodation of the chip 15 inside the seat, by way of the application of an adhesive label 17, which can bear the logo or a decoration, which keeps the chip 15 in the seat.

In substance, the adhesive label 17, applied on the opposite surface of the insert 7 from the surface from which the pair of protrusions 7b rise, makes it possible to keep the chip 15 firmly in place inside the seat 16.

The adhesive label 17 is such that it completes the profile of the insert 7, which is interrupted by the through seat 16, and it constitutes a resting surface for the identification device 15 which can conveniently be an RFID tag or an NFC tag, in general a chip.

In practice it has been found that the nose pad thus conceived fully achieves the set aim and objects.

Providing the connecting portion from material that is at least elastically deformable makes it possible to facilitate the mounting and disassembly of the plate on/from the respective pin.

Furthermore, providing the nose pad and the connecting portion in a single piece, using a material that is transparent and elastically deformable, makes it possible to obtain a nose pad provided with an embedded (encapsulated) insert which has excellent properties of movement on the pin, as well as a high level of reliability of assembly/disassembly of the nose pad by virtue of the material used.

Furthermore, the identification device embedded in at least one nose pad according to the disclosure makes it possible to identify the pair of eyeglasses using an external reading device.

The nose pad, thus conceived, is susceptible of numerous modifications and variations, all of which are within the scope of the appended claims.

In practice, the materials used, as well as the contingent shapes and dimensions, may be any according to the requirements and to the state of the art.

The disclosures in Italian Patent Application No. 102018000010186 from which this application claims priority are incorporated herein by reference.

The invention claimed is:

1. A nose pad for a nosepiece of a pair of eyeglasses, which is made of material that is at least partially transparent and defines a resting surface which can be rested directly on the nose of a user, the nose pad comprising:
   a connecting portion fixed to the nose pad and provided with a through hole configured for connection to a supporting pin which is integral with a frame of the pair of eyeglasses; and
   an insert at least partially embedded within the nose pad and visible from the outside through a transparent portion of said resting surface of the nose pad;
   said connecting portion of the nose pad being made of a material that is deformable at least elastically, said insert being provided with an identification device that is adapted to be read by an external reading device,
   wherein said insert is provided with a seat for the accommodation of said identification device and wherein said seat defined in the insert is a through seat which interrupts an external profile of said insert, of dimensions and shape that are suitable to allow accommodation of said identification device.

2. The nose pad according to claim 1, wherein said nose pad and said connecting portion are provided in a single piece by said deformable material and wherein said material is at least partially transparent.

3. The nose pad according to claim 1, wherein the insert comprises a plate which has, on an opposite side with respect to said resting surface of the nose pad, a pair of protrusions which are at least partly not covered by said deformable material.

4. The nose pad according to claim 1, wherein the insert comprises a plate which has, on an opposite side with respect to said resting surface of the nose pad, a pair of protrusions, internal surfaces of which that protrude toward the plate being at least partly covered by said deformable material.

5. The nose pad according to claim 1, wherein said insert is provided with an adhesive label that is adapted to keep said identification device accommodated in said through seat.

6. The nose pad according to claim 5, wherein said adhesive label is configured to complete the profile of said insert, which is interrupted by said through seat, and constitute a resting surface for said identification device.

7. The nose pad according to claim 1, wherein said identification device is an RFID tag.

8. The nose pad according to claim 1, wherein said identification device is an NFC tag.

9. The nose pad according to claim 1, wherein said nose pad is formed by overmolding around said insert.

10. A pair of eyeglasses, comprising at least one nose pad according to claim 1.

11. A method for providing a nose pad according to claim 1, the method including the following steps:
   starting from an insert, from one face of which connecting portions rise, defining a through seat in said insert,
   applying an adhesive label to said one face of said insert that is opposite with respect to a face from which said connecting portions rise,
   inserting an identification device into said through seat of said insert, said identification device being locked in said seat by said adhesive label, and
   inserting said insert into a mold so as to form said nose pad and said connecting portion by overmolding around said insert.

12. A nose pad for a nosepiece of a pair of eyeglasses, which is made of material that is at least partially transparent and defines a resting surface which can be rested directly on the nose of a user, the nose pad comprising:
   a connecting portion fixed to the nose pad and provided with a through hole configured for connection to a supporting pin which is integral with a frame of the pair of eyeglasses; and
   an insert at least partially embedded within the nose pad and visible from the outside through a transparent portion of said resting surface of the nose pad;
   said connecting portion of the nose pad being made of a material that is deformable at least elastically, said insert being provided with an identification device that is adapted to be read by an external reading device,
   wherein said insert is provided with a through seat for the accommodation of said identification device, wherein said insert is provided with an adhesive label that is adapted to keep said identification device accommodated in said through seat and wherein said adhesive label is configured to complete the profile of said insert, which is interrupted by said through seat, and constitute a resting surface for said identification device.

* * * * *